(12) United States Patent
Knox

(10) Patent No.: US 11,455,651 B2
(45) Date of Patent: Sep. 27, 2022

(54) ATTRIBUTION OF CONVERSION MADE BY A CLIENT USING IMPRESSION BLOCK AND CONVERSION BLOCK

(71) Applicant: Meta Platforms, Inc., Menlo Park, CA (US)

(72) Inventor: Andrew Knox, Brooklyn, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 177 days.

(21) Appl. No.: 16/386,110

(22) Filed: Apr. 16, 2019

(65) Prior Publication Data

US 2020/0334708 A1  Oct. 22, 2020

(51) Int. Cl.
*G06Q 30/00* (2012.01)
*G06Q 30/02* (2012.01)
*H04L 9/32* (2006.01)
*H04L 9/00* (2022.01)

(52) U.S. Cl.
CPC ....... *G06Q 30/0242* (2013.01); *H04L 9/3218* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2006/0218091 A1* | 9/2006 | Choy | .................. | G06Q 20/102 |
| | | | | 705/40 |
| 2007/0244746 A1* | 10/2007 | Issen | ..................... | H04L 67/306 |
| | | | | 709/224 |
| 2014/0222548 A1* | 8/2014 | Fagalde | ............. | G06Q 30/0242 |
| | | | | 705/14.41 |
| 2015/0302456 A1* | 10/2015 | Rego | .................. | G06Q 30/0235 |
| | | | | 705/14.35 |
| 2017/0068987 A1 | 3/2017 | Levinson et al. | | |
| 2017/0103385 A1* | 4/2017 | Wilson, Jr. | ......... | G06Q 20/3678 |
| 2018/0077122 A1* | 3/2018 | Hoss | ................... | G06F 21/6254 |
| 2019/0087844 A1 | 3/2019 | Leekley et al. | | |
| 2019/0205932 A1* | 7/2019 | Ericson | ............. | G06Q 30/0255 |
| 2019/0333048 A1* | 10/2019 | DiCross | ............... | G06Q 20/363 |
| 2021/0065236 A1* | 3/2021 | Khan | ................. | G06Q 30/0252 |

OTHER PUBLICATIONS

Federico Tenga, How to write stuff on the Blockchain, Jun. 27, 2016, www.medium.com (Year: 2016).*
Making Facebook Ads Work for Your Business, Aug. 2017, ME Marketing Services (Year: 2017).*

(Continued)

*Primary Examiner* — Naresh Vig
(74) *Attorney, Agent, or Firm* — Fenwick & West LLP

(57) ABSTRACT

A content publisher may transfer an impression token value to a user in response to the content publisher displaying an advertisement for a merchant to the user. The content publisher may record the transfer on a zero knowledge blockchain. The merchant may transfer a conversion token value to the user in response to the user making a purchase from the merchant. The merchant may record the transfer on the zero knowledge blockchain. The user may transfer the impression token value and the conversion token value to a measurement company. The measurement company may calculate attribution and lift results for the advertisement.

17 Claims, 5 Drawing Sheets

(56) References Cited

OTHER PUBLICATIONS

DiCross, U.S. Appl. No. 62/396,462, filed Apr. 27, 2018 (Year: 2018).*
Information on VigLink.com, 2019, VigLink, archived web pages printed through www.archive.org, date is in the URL in YYYYMMDD format (Year: 2019).*
Parssinen et al. published article "Is Blockchain Ready to Revolutionize Online Advertising?", Oct. 19, 2018, IEEEAccess, vol. 6, pp. 5844-5899 (Year: 2018).*
Brave Software. "Basic Attention Token (BAT): Blockchain Based Digital Advertising." Mar. 13, 2018, pp. 1-37.
Greenspan, G. "Understanding Zero Knowledge Blockchains." Multichain.com, Nov. 3, 2016, 6 pages, [Online] [Retrieved Jul. 1, 2020], Retrieved from the internet <URL://www.multichain.com/blog/2016/11/understanding-zero-knowledge-blockchains/>.
PCT International Search Report and Written Opinion, PCT Application No. PCT/US2020/027502, dated Sep. 15, 2020, 12 pages.

* cited by examiner

ATTRIBUTION OF CONVERSION MADE BY A CLIENT USING IMPRESSION BLOCK AND CONVERSION BLOCK

FIELD OF ART

The present disclosure generally relates to the field of computer technology, and more specifically, to attribution for conversions.

BACKGROUND

Computer systems use various software programs and methods to evaluate marketing attribution and lift. Attribution describes how different actions and events contribute to the success of marketing and sales efforts. For example, cookies may be used to track a user's online actions. HTTP cookies (also referred to as a web cookie, Internet cookie, browser cookie, or simply cookie) are small pieces of data sent from a website and stored on the user's computer by the user's web browser while the user is browsing. Cookies allow websites to remember stateful information (such as items added in the shopping cart in an online store) or to record the user's browsing activity (including clicking buttons, logging in, or recording which pages were visited in the past).

The cookies may cause the user's actions to be stored in a log file, and when the user makes a purchase, the log file may indicate what advertisements and content the user previously viewed. However, many users and content publishers concerned with user privacy are hesitant to allow cookies to track an individual's online activity, especially when the tracking is performed by third parties. Additionally, many newer browsers and operating systems implement standards that prevent cross-site sharing of user data. It is difficult for existing systems to accurately calculate marketing attribution and lift while maintaining sufficient user privacy.

SUMMARY

Systems and methods are described herein that use a zero knowledge blockchain to calculate attribution and lift results without compromising user privacy. A content publisher may transfer an impression token value to a user in response to the content publisher displaying an advertisement for a merchant to the user. The content publisher may record the transfer on a zero knowledge blockchain. The merchant may transfer a conversion token value to the user in response to the user making a purchase from the merchant. The merchant may record the transfer on the zero knowledge blockchain. The user may transfer the impression token value and the conversion token value to a measurement company. The measurement company may calculate attribution and lift results for the advertisement.

In some embodiments, the recited components may perform actions including: transmitting, by a content publisher, an advertisement to a client device; transferring, by the content publisher, an impression token value to the client device based on the transmitting of the advertisement; and publishing, by the content publisher, an impression block to a zero knowledge blockchain, wherein the impression block records the transferring of the impression token value.

In some embodiments, a merchant transfers a conversion token value to the client device. The client device may transfer the impression token value and the conversion token value to a measurement company. The actions may comprise storing, by the content publisher, a copy of the zero knowledge blockchain. The copy of the zero knowledge blockchain may comprise the impression block, a conversion block recording a transfer of a conversion token value from a merchant to the client device, and a measurement block recording a transfer of the impression token value and the conversion token value from the client device to a measurement company. The actions may comprise receiving, by the content publisher and from the measurement company, a result of an attribution calculation or a lift calculation. The actions may comprise generating, by the content publisher, a zero knowledge proof verifying the transferring of the impression token value.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
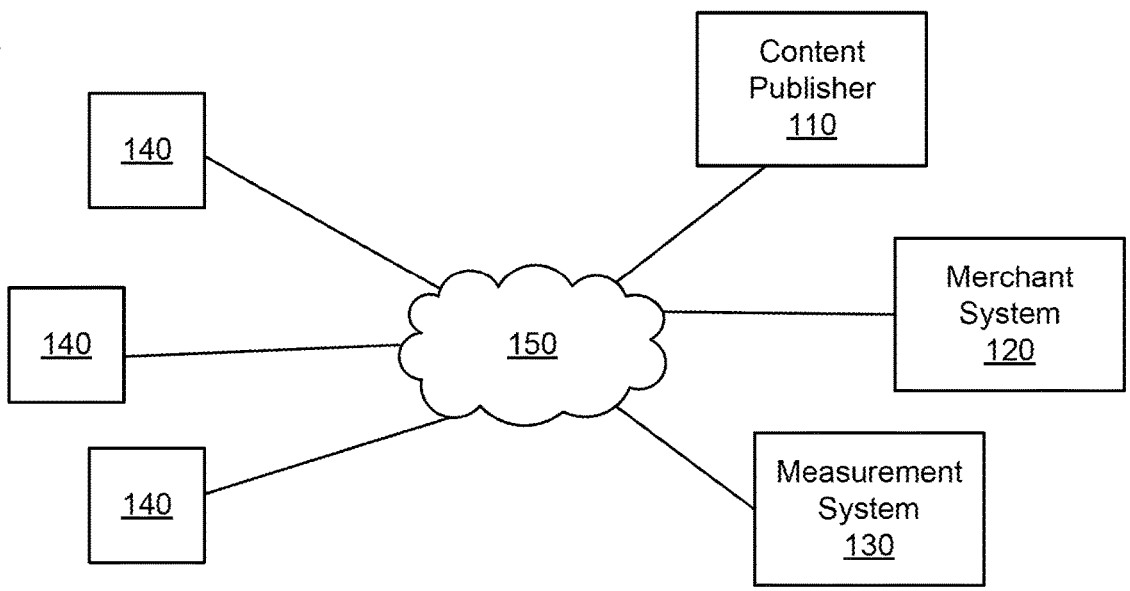
FIG. 1 is a block diagram of a system for calculating marketing attribution and lift using a zero knowledge blockchain, in accordance with an embodiment.

FIG. 1 illustrates a detailed view of a system 100 for calculating attribution and lift using a zero knowledge blockchain. The system 100 may comprise a content publisher 110, a merchant system 120, a measurement company 130, and one or more client devices 140. These various components are now described in additional detail.

The content publisher 110 may comprise one or more computers, servers, and/or databases configured to generate digital content, such as a website or application, which may be accessed over a network. The content publisher 110 may be configured to transmit advertisements to the client devices 140 on behalf of third-party advertisers, such as the merchant system 120. The content publisher 110 provides impressions of advertisements to the client devices 140. A single instance of a content item being served (e.g., provided or "published") to a client device 140 is referred to herein as an impression. In some embodiments, an impression is only counted (i.e., recordable impression information is generated) when the content item is fully displayed, displayed above a threshold amount (e.g., at least 80% of the surface area of an image, or at least 50% of the duration of a video), displayed for at least a threshold amount of time (e.g., one second), when a user engages with the content item, when a user initiates a purchase in response to the content item, or based on one or more other conditions or a combination of conditions. Impression level data, also referred to as impression data, is data that describes individual impressions. In some embodiments, an impression is generated when content is transmitted, and impression level data includes data describing the extent of the content that is presented (e.g., in terms of display area or time), user interaction with the content, etc. Impression level data may include an identification of a recipient of an impression (e.g., a client device 140 or a user of the client device 140), a time or approximate time of the impression, and an identification of the content.

The content publisher 110 may directly provide the content to client devices 140, e.g., through an app or website provided by the content publisher 110. In addition, the content publisher 110 may arrange with one or more additional content publishers to provide the content to client devices 140. For example, the content publisher 110 may provide advertisements to another content publisher (e.g., a website or app provider), which displays the advertisements to client devices 140 that access a webpage or application of the content publisher 110. The content publisher 110 may be configured to store a log file of actions performed by the client device 140, such as URLs visited by the client device 140 and advertisements displayed to the client device 140. The content publisher 110 may store demographic information of users which maintain accounts with the content publisher 110.

The merchant system 120 may comprise one or more computers, servers, and/or databases configured to generate digital content, such as a website or application, which may be accessed over a network. The merchant system 120 may be operated by a merchant that sells goods or services. The merchant may advertise on third-party websites or applications, such as those provided by the content publisher 110. The merchant system 120 may be configured to store a log file of actions performed by the client device 140, such as URLs visited by the client device 140 and purchases made by the client device 140.

The measurement company 130 may comprise one or more computers, servers, and/or databases configured to calculate attribution and lift. In some embodiments, the measurement company 130 may be a subsystem of, or controlled by, the content publisher 110 or the merchant system 120. In some embodiments, the measurement company 130 may be operated by an independent third-party and charge a fee for its services to the merchant system 120 or the measurement company 130.

The client devices 140 are one or more computing devices capable of receiving user input as well as transmitting and/or receiving data via the network 150. In one embodiment, a client device 140 is a conventional computer system, such as a desktop or a laptop computer. Alternatively, a client device 140 may be a device having computer functionality, such as a personal digital assistant (PDA), a mobile telephone, a smartphone, or another suitable device. A client device 140 is configured to communicate via the network 150. In one embodiment, a client device 140 executes an application allowing a user of the client device 140 to interact with the content publisher 110. For example, a client device 140 executes a browser application to enable interaction between the client device 140 and the content publisher 110 via the network 150. In another embodiment, a client device 140 interacts with the content publisher 110 through an application programming interface (API) running on a native operating system of the client device 140, such as IOS® or ANDROID™.

The network 150 may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Figure 2:
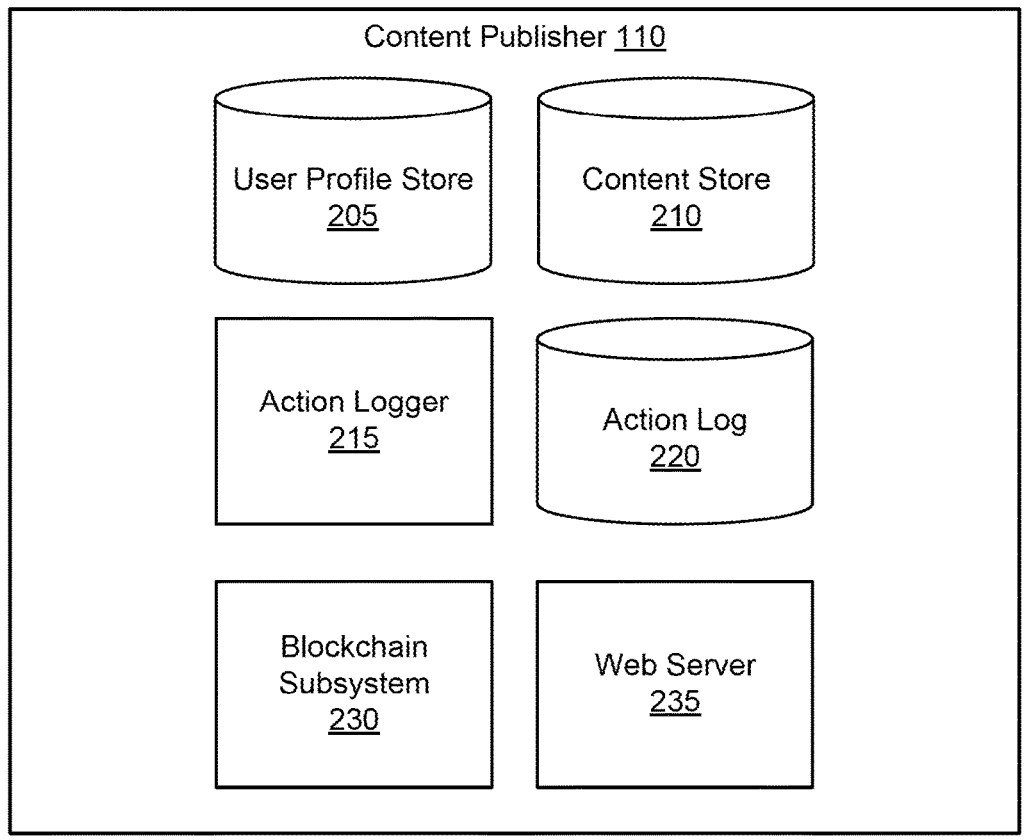
FIG. 2 is a block diagram of content publisher, in accordance with an embodiment.

FIG. 2 is a block diagram of an architecture of the content publisher 110. The content publisher 110 shown in FIG. 2 includes a user profile store 205, a content store 210, an action logger 215, an action log 220, a blockchain subsystem 230, and a web server 235. In other embodiments, the content publisher 110 may include additional, fewer, or different components for various applications. Additional components such as network interfaces, security functions, load balancers, failover servers, management and network operations consoles, and the like are not shown so as to not obscure the details of the system architecture.

Each user of the content publisher 110 is associated with a user profile, which is stored in the user profile store 205. A user profile includes declarative information about the user that was explicitly shared by the user and may also include profile information inferred by the content publisher 110. In one embodiment, a user profile includes multiple data fields, each describing one or more attributes of the corresponding system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the content publisher 110, user profiles may also be stored for entities such as businesses or organizations. This allows an entity to establish a presence on the content publisher 110 for connecting and exchanging content with other system users. The entity may post information about itself, about its products or provide other information to users of the content publisher 110 using a brand page associated with the entity's user profile. Other users of the content publisher 110 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. System users may create objects stored by the content store 210, such as status updates, photos tagged by users to be associated with other objects in the content publisher 110, events, groups or applications. In some embodiments, objects are received from third-party applications or third-party applications separate from the content publisher 110. In one embodiment, objects in the content store 210 represent single pieces of content, or content "items." Hence, system users are encouraged to communicate with each other by posting text and content items of various types of media to the content publisher 110 through various communication channels. This increases the amount of interaction of users with each other and increases the frequency with which users interact within the content publisher 110.

One or more content items included in the content store 210 include advertisements for presentation to a user and a bid amount. The advertisements may include content items which include content such as text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the content publisher 110 in exchange for an impression of the content item. For example, the bid amount included in a content item specifies a monetary amount that the content publisher 110 receives from a merchant or other third-party system that provided the content item to the content publisher 110 if a client device 140 receives an impression of that content item. In some embodiments, the expected value to the content publisher 110 of presenting the content from the content item may be determined by multiplying the bid amount by a probability of the content of the content item being accessed (e.g., clicked) by a user.

In various embodiments, a content item includes various components capable of being identified and retrieved by the content publisher 110. Example components of a content item include: a title, text data, image data, audio data, video data, a landing page, a user associated with the content item, or any other suitable information. The content publisher 110 may retrieve one or more specific components of a content item for presentation in some embodiments. For example, the content publisher 110 may identify a title and an image from a content item and provide the title and the image for presentation rather than the content item in its entirety.

Various content items may include an objective identifying an interaction that a user associated with a content item desires other users to perform when presented with content included in the content item. Example objectives include: purchasing a good or service from a merchant, installing an application associated with a content item, indicating a preference for a content item, sharing a content item with other users, interacting with an object associated with a content item, or performing any other suitable interaction. As content from a content item is presented to system users, the content publisher 110 logs interactions between users presented with the content item or with objects associated with the content item. Additionally, the content publisher 110 receives compensation from a user associated with content item as system users perform interactions with a content item that satisfy the objective included in the content item. In some embodiments, impression level data comprises data describing any of these objectives.

Additionally, a content item may include one or more targeting criteria specified by the user who provided the content item to the content publisher 110. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the content publisher 110. Targeting criteria may also specify interactions between a user and objects performed external to the content publisher 110. For example, targeting criteria identifies users that have taken a particular action, such as sent a message to another user, used an application, joined a group, left a group, joined an event, generated an event description, purchased or reviewed a product or service using an online marketplace, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the content publisher 110, populating the action log 220 with information about user actions. Examples of actions include adding a connection to another user, sending a message to another user, uploading an image, reading a message from another user, viewing content associated with another user, and attending an event posted by another user. In addition, actions may involve an object and one or more particular users, so these actions are associated with the particular users as well and stored in the action log 220.

The action log 220 may be used by the content publisher 110 to track user actions with the content publisher 110, as well as actions on third-party systems that communicate information to the content publisher 110. Users may interact with various objects provided by the content publisher 110, and information describing these interactions is stored in the action log 220. Examples of interactions with objects include: commenting on posts, sharing links, checking-in to physical locations via a client device 140, accessing content items, and any other suitable interactions. Additionally, the action log 220 may record a user's interactions with advertisements provided by the content publisher 110 as well as with other applications operating on the content publisher 110. In some embodiments, data from the action log 220 is used to infer interests or preferences of a user, augmenting the interests included in the user's user profile and allowing a more complete understanding of user preferences.

The blockchain subsystem 230 receives data reflecting activities of participating entities, such as the content publisher 110, the merchant system 120, and the client devices 140 and adds such data to a blockchain. In particular, the blockchain subsystem 230 creates tokens, collects impression data, calculates a token value, creates impression blocks representing a transfer of one of more tokens to a user, and adds the impression blocks to a zero knowledge blockchain. The zero knowledge blockchain may be a blockchain on which cryptocurrency transfers are recorded. The blockchain may record shielded transactions that can be fully encrypted on the blockchain, yet still be verified as valid under the network's consensus rules using proofs, such as Zero Knowledge Succinct Non-Interactive Argument of Knowledge ("zk-SNARK") proofs. Zero knowledge proofs allow a prover to prove to a verifier that a statement is true, without revealing any information beyond the validity of the statement itself. The blockchain subsystem 230 may store a copy of the blockchain. The blockchain may also include blocks added by one or more additional parties. The blockchain subsystem 230 is described in greater detail with respect to FIG. 3.

The web server 235 links the content publisher 110 via the network 150 to the one or more client devices 140, as well as to the merchant system 120 and the measurement company 130. The web server 235 serves web pages, as well as other content, such as JAVA®, FLASH®, XML and so forth. The web server 235 may receive and route messages between the content publisher 110 and the client devices 140, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
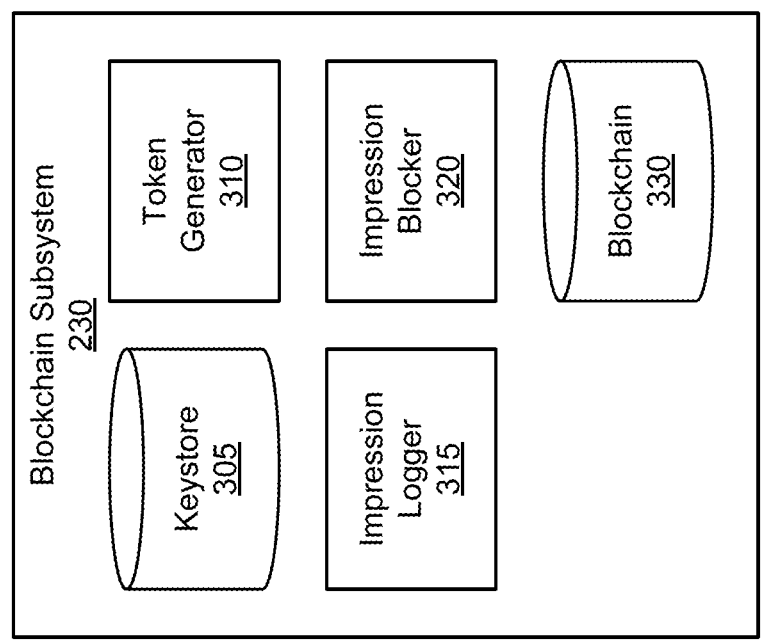
FIG. 3 is a block diagram of a blockchain subsystem of the content publisher, in accordance with an embodiment.

FIG. 3 is a block diagram of the blockchain subsystem 230 of the content publisher 110, in accordance with an embodiment. The blockchain subsystem 230 includes a key store 305, a token generator 310, an impression logger 315, an impression blocker 320, and a copy of a blockchain 330. In other embodiments, the blockchain subsystem 230 includes fewer, additional, or alternative elements to those shown in FIG. 3. In some embodiments, each entity shown in FIG. 1, including the content publisher 110, the merchant system 120, and the client device 140, includes a blockchain subsystem similar to the blockchain subsystem 230 shown in FIG. 3.

The key store 305 may store keys which may be used by the blockchain subsystem 230. The keys may include spending keys used to control addresses, proving keys used to generate proofs that inputs are valid, and verifying keys used to check proofs. The keys may be received from an initial setup ceremony, as further described herein.

The token generator 310 may be configured to generate tokens. The token generator 310 may send a visible blockchain transaction certifying those tokens' value. The token generator 310 may then perform a second transaction which converts the visible tokens into anonymized notes.

The impression logger 315 receives data describing impressions provided by the content publisher 110 or on behalf of the content publisher 110. The impression logger 315 logs this received data in an impressions log. The impression logger 315 logs, for each impression, an identifier of the user or client device 140 to which the impression was delivered and a time that the impression was served.

The impression blocker 320 assigns a token value to an impression. The impression blocker 320 writes data to the blockchain 330 representing a transfer of a token value to users based on the impression data. The impression blocker 320 uses zk-SNARKs to prove that the conditions for a valid transaction have been satisfied without revealing any crucial information about the addresses or values involved. The impression blocker 320 constructs a proof to show that: (1) the input values sum to the output values for each shielded transfer, (2) the blockchain subsystem 230 has the private spending keys of the input notes, giving the blockchain subsystem 230 the authority to spend, and (3) the private spending keys of the input notes are cryptographically linked to a signature over the whole transaction, in such a way that the transaction cannot be modified by a party who did not know these private keys.

The impression block data is published to a blockchain. The blockchain subsystem 230 includes a copy of the blockchain 330. The blockchain 330 stores blocks published by the blockchain subsystem 230. The blockchain subsystem 230 may also receive impression blocks, conversion blocks, and measurement blocks published by other systems, such as blocks published by merchant systems, client devices, other content publishers, or other online systems. The blockchain subsystem 230 also stores these blocks on its copy of the blockchain 330. In some embodiments, multiple blockchains or branches of blockchains are created by the blockchain system 230 and/or other participants of the blockchain(s).

The various components shown in FIG. 1 and FIG. 2, such as the merchant system 120, the measurement company 130, and the client devices 140, may each comprise a blockchain subsystem similar to blockchain subsystem 230 which allows the respective entities to store copies of the blockchain, create new transactions and blocks, and verify existing transactions and blocks.

Figure 4:
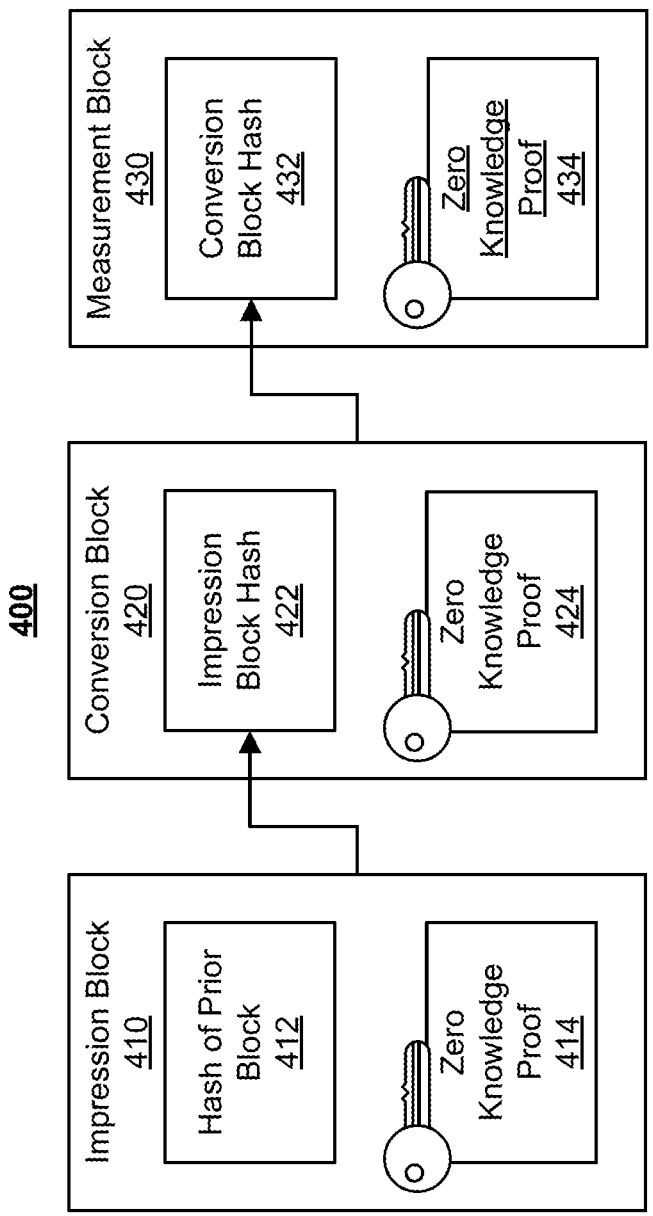
FIG. 4 is an example portion of a zero knowledge blockchain, in accordance with an embodiment.

FIG. 4 is an example portion of a blockchain 400 that includes an impression block 410, a conversion block 420, and a measurement block 430. A common reference string shared between prover and verifier, also referred to as the public parameters of the blockchain, may be generated in an initial setup phase for the blockchain, as is known in existing zero knowledge blockchains. The public parameters may be generated in a multi-party ceremony which may involve one or more of the participants of the system 100. The multi-party ceremony may generate spending keys used to control addresses, proving keys used to generate proofs that inputs are valid, and verifying keys used to check proofs. The keys may be distributed among participants in the blockchain.

In general, each block in a blockchain is formed by combining a hash of the previous block in the blockchain with the transaction data for the block being added. The block may further include a timestamp that the block is added to the blockchain. One or more transactions on the blockchain may be shielded. One or more transactions on the blockchain may use shielded addresses. Each party may generate an unlimited number of tokens which may be transferred between parties. The tokens may be generated by sending a visible blockchain transaction certifying those tokens' value. The token issuer may then perform a second transaction which converts the visible tokens into anonymized notes. These anonymized notes can then be secretly transferred from the issuer to others, and onwards among the blockchain's participants. The transfers may be recorded by nodes of the blockchain. Transfers of multiple types of currencies may be recorded on the blockchain.

Blockchain nodes may store spendable transactions called commitments. In order to spend a commitment, a sender may reveal a nullifier. Blockchain nodes may store lists of all the commitments that have been created and all the nullifiers that have been revealed. The commitments and nullifiers may be stored as hashes to maintain privacy. For each new note created by a shielded payment, a commitment may be published. The commitment may comprise a hash of at least one of the amount sent, the recipient's address, a number rho which is unique to the note, or a random nonce.

When a shielded transaction is spent, the sender uses their spending key to publish a nullifier which is the hash of the rho from an existing commitment that has not been spent. The sender may provide a zero knowledge proof demonstrating that the sender is authorized to spend the transaction.

The first block in the example portion of the blockchain 400 is an impression block 410. The impression block 410 may include a hash 412 of a prior block (not shown in FIG. 4), and a zero knowledge proof of validity 414. The impression block 410 may be generated by the content publisher in response to displaying an advertisement to a user. The impression block 410 may record a transfer of impression tokens from the content publisher to the user. The impression blocker 320 uses a proving key to generate the zero knowledge proof 414 verifying that the inputs are valid. The zero knowledge proof 414 verifies that: for each input note, a revealed commitment exists; the nullifiers and note commitments are computed correctly; and it is infeasible for the nullifier of an output node to collide with the nullifier of any other note.

The second block in the example portion of the blockchain 400 is a conversion block 420. The conversion block 420 may include a hash 422 of the impression block 410, and a zero knowledge proof of validity 424. The conversion block 420 may be generated by the merchant system in response to the user performing an action. In one embodiment, the action may include the user making a purchase for goods or services from the merchant. In other embodiments, the action may include the user selecting a link, interacting with an object, watching a video, or accessing a webpage provided by the merchant system. In response to the user performing the action, the merchant system may transmit a conversion token value to the user. In one embodiment, the conversion token value may be based on the specific action performed by the user. For example, the conversion token value may be proportional to the cost of an item purchased by the user from the merchant system. The conversion block 420 may record the transfer of conversion tokens from the merchant system to the user. The merchant system may use a proving key to generate a zero knowledge proof 424 verifying that the inputs are valid. The merchant system may publish the transfer as a shielded transaction using their spending key, such that other parties are unable to see the details of the transaction.

The third block in the example portion of the blockchain 400 is a measurement block 430. The measurement block 430 may include a hash 432 of the conversion block 420, and a zero knowledge proof of validity 434. The measurement block 430 may be generated by the client device in response to a request from the merchant system. For example, the merchant system may offer the user a discount on a purchase if the user agrees to transfer impression and conversion tokens to a measurement company. In response to the user accepting the offer, such as by clicking on a link, the client device may initiate a transfer and generate the measurement block 430. In one embodiment, the browser or operating system on the client device may be programmed to automatically transfer impression and conversion tokens in response to an action taken on the client device, such as the user making a purchase for goods or services from the merchant. In other embodiments, the action may include the user selecting a link, interacting with an object, watching a video, or accessing a webpage provided by the merchant system. In response to the merchant request, or the user performing the action, the client device may transfer the impression tokens and the conversion tokens to the measurement company. The merchant system may publish or transmit a list of tokens that the merchant system is willing to accept for a specific purchase. For example, the merchant system may accept tokens that were issued by the merchant for an advertisement for a relevant product. The merchant system may also publish amounts of tokens the merchant is willing to accept and what discounts the merchant may provide in exchange for the user transferring the tokens. The client device may select available tokens to transfer by comparing tokens received by the client device with tokens the merchant system is willing to accept. In some embodiments, the client device may prompt the user to select tokens to transfer.

The measurement block 430 may record the transfer of tokens from the user to the measurement company. The client device may use a proving key to generate a zero knowledge proof 434 verifying that the inputs are valid. The client device may publish the transfer as a shielded transaction using its spending key, such that parties other than the user and the measurement company are unable to see the details of the transaction.

Figure 5:
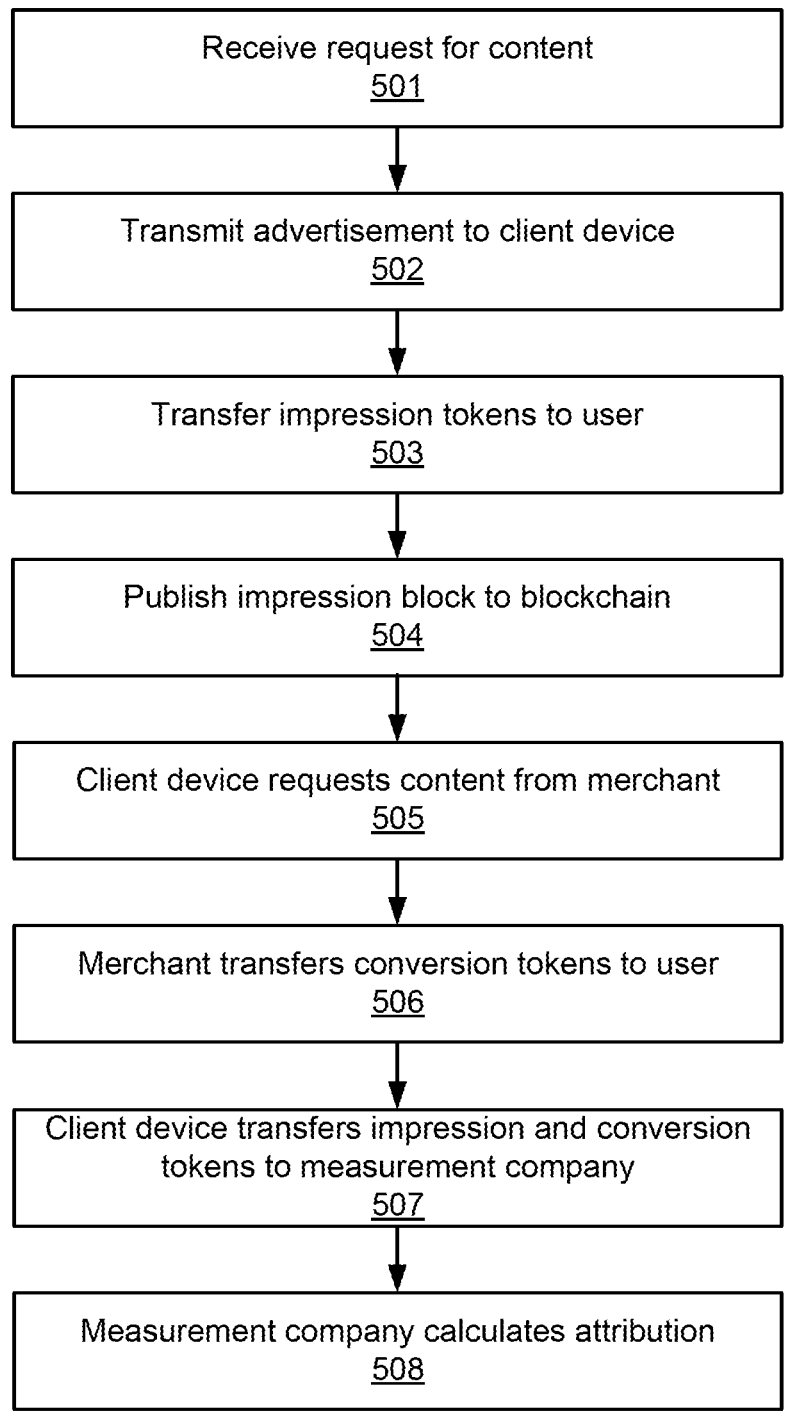
FIG. 5 is a flow chart showing a method of calculating attribution using a zero knowledge blockchain, in accordance with an embodiment.

FIG. 5 is a flow chart showing a method 500 of calculating attribution using a zero knowledge blockchain. In other embodiments, the process may include different and/or additional steps than those shown in FIG. 5. Additionally, steps of the method 500 may be performed in different orders than the order described in conjunction with FIG. 5 in various embodiments.

A content publisher receives a request for content from a client device (step 501). For example, the user may visit a website provided by the content publisher using a browser on a client device, the user may open a mobile application provided by the content publisher, or the user may access a skill using a voice personal assistant. In one embodiment, the client device may transmit an HTTP request to the content publisher to access a webpage. In response to the request, the content publisher may transmit the requested content to the client device.

The content publisher may transmit an advertisement to the client device on behalf of a merchant (step 502). One or more of the provided advertisements may be an advertisement for a merchant. For example, the advertisement may provide an offer for a product sold by the merchant, and the advertisement may include a link to visit a website provided by the merchant. The content publisher may store impression data describing the presentation of the advertisement to the user.

The content publisher may transfer an impression token value to the user (step 503). In some embodiments, the user may provide the content publisher with a payment address in conjunction with the request for content from the content publisher. In some embodiments, the content publisher may provide the user with a private key controlling an address with a token, and the user may optionally transfer the token to an account unknown to the content publisher. The content publisher may generate an impression block on a zero knowledge blockchain recording the transfer of the impression token value to the user. The impression blocker adds the impression block to the blockchain (step 504). The impression blocker generates a zero knowledge proof of validity using a proving key, and publishes the new block to the blockchain.

The client device may transmit a request for content to the merchant (step 505). For example, the user may open a mobile application, select a link, or type in a URL on the client device. The user may perform an action, such as purchasing a good or service from the merchant, viewing a video provided by the merchant, or creating an account with the merchant. In response to the purchase or other action, the merchant may transfer a conversion token value to the user (step 506). The merchant adds a conversion block to the blockchain. The merchant may generate a zero knowledge proof of validity using the merchant's proving key, and the merchant may publish the new conversion block to the blockchain. The merchant may instruct the user to transfer impression and conversion token values to a measurement company. In one embodiment, the merchant may offer the user a discount on the purchase if the user agrees to transmit the impression and conversion token values to the measurement company. In one embodiment, the merchant may instruct the user that, as a condition of the purchase, the user agrees to transmit the impression and token values to the measurement company. The merchant may transmit a wallet address of the measurement company to the client device to assist the user in transmitting the impression and conversion token values to the measurement company.

The client device may transfer the impression token value and the conversion token value to the measurement company (step 507). The client device may generate a measurement block on the zero knowledge blockchain recording the transfer of the impression token value and the conversion token value to the measurement company. The client device adds the measurement block to the blockchain. The client device generates a zero knowledge proof of validity using a proving key, and publishes the new block to the blockchain. The zero knowledge proof may expose relative timing information to the measurement company. For example, the zero knowledge proof may provide the specific time at which any impression token values were received by the user, as well as the specific time at which any conversion token values were received by the user. The user may have received impression tokens from multiple different content publishers, and the impression tokens may have been generated by, and traceable back to the respective content publishers. In some embodiments, the user may transfer the impression and conversion token values to the merchant or the content publisher, and the merchant or the content publisher may subsequently transfer the impression and conversion token values to the measurement company.

The measurement company may evaluate the impression token values and the conversion token values and calculate an attribution result (step 508). For example, the measurement company may receive impression tokens generated by only one content publisher, and the measurement company may determine that the conversion is attributable to the advertisement provided by the content publisher. In one embodiment, the measurement company may receive impression tokens generated by multiple content publishers, and the measurement company may attribute the conversion to the content publisher which transferred impression tokens to the user most closely in time to the conversion tokens being transferred from the merchant to the user. Those skilled in the art will recognize that many complex attribution algorithms are known in the art, which may apportion attribution to multiple parties, and the measurement company may use any suitable known attribution schemes in order to calculate the attribution result.

The measurement company may transmit the attribution results to the content publisher or the merchant. The content publisher and the merchant may utilize the attribution results to better inform future advertisement campaigns, or to calculate compensation owed by the merchant to the content publisher in exchange for the content publisher transmitting the advertisement to the client device.

Figure 6:
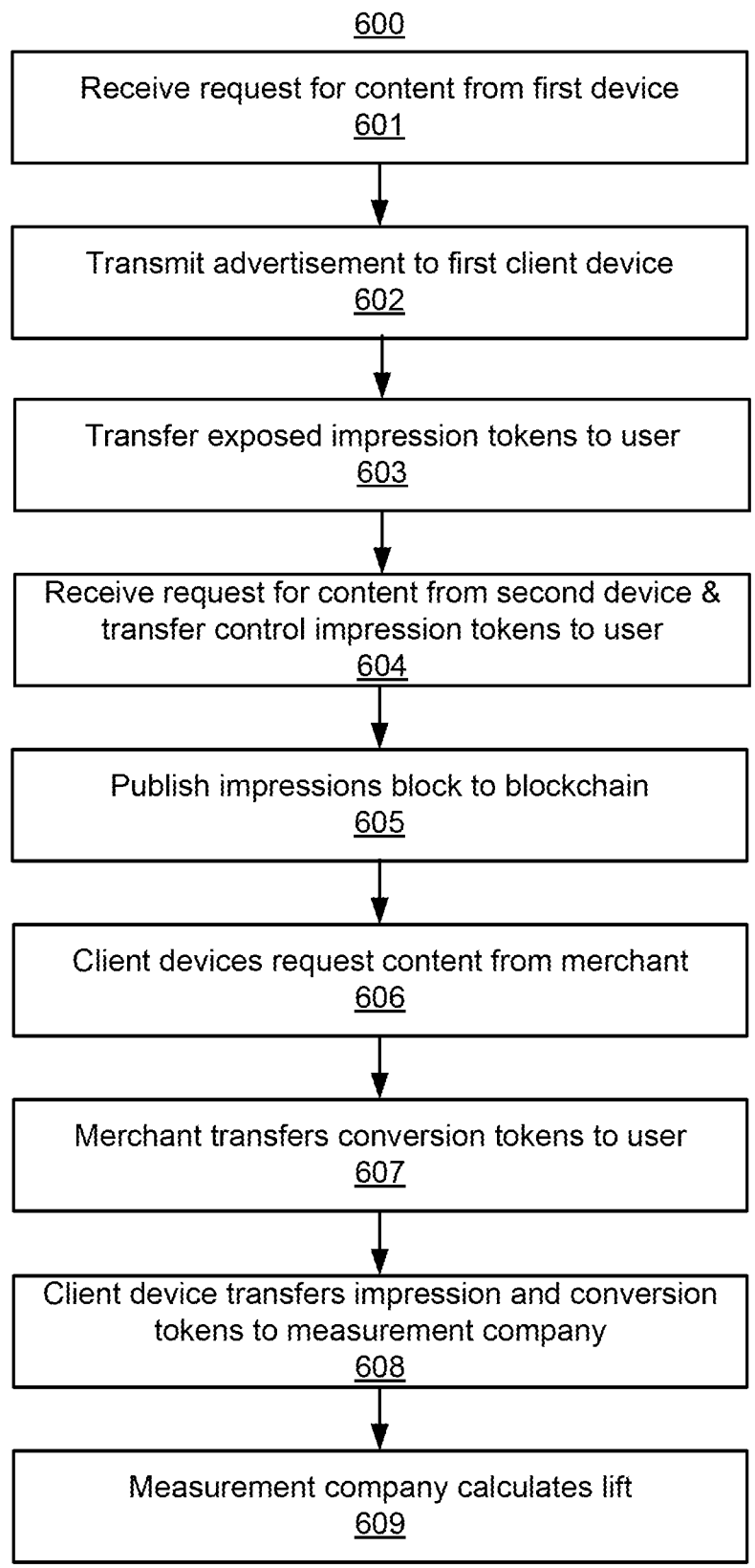
FIG. 6 is a flow chart showing a method of calculating lift using a zero knowledge blockchain, in accordance with an embodiment.

FIG. 6 is a flow chart showing a method 600 of calculating lift using a zero knowledge blockchain. Lift refers to an increase in conversions in response to marketing. Specifically, lift refers to an increase in likelihood that a user will purchase a good or service in response to viewing an advertisement. In some embodiments, the process may include different and/or additional steps than those shown in FIG. 6. Additionally, steps of the method 600 may be performed in different orders than the order described in conjunction with FIG. 6 in various embodiments.

A content publisher may generate multiple currencies. For example, the content publisher may generate an exposed impression currency which the content publisher transfers to users who view an advertisement, and the content publisher may generate a control impression currency which the content publisher transfers to users who do not view the advertisement, or who view a different advertisement. The transfers of both currency types may be recorded on the same zero knowledge blockchain.

A content publisher receives a request for content from a first client device (step 601). For example, a user may open a mobile application, select a link, or type in a URL on a client device. The content publisher may transmit one or more content items to the first client device. The content publisher may transmit an advertisement to the first client device on behalf of a merchant (step 602). The content publisher may store impression data describing the presentation of the advertisement to the user. The content publisher may transfer an exposed impression token value to the user (step 603). The content publisher may transfer an exposed impression token value to a plurality of users that view the advertisement.

The content publisher may receive a request for content from a second client device (step 604). The content publisher does not display the advertisement to the second client device. In some embodiments, the content publisher may display a different advertisement to the second client device. The content publisher may transmit a control impression token value to the second client device. The content publisher may transmit the control impression token value to a plurality of client devices that do not receive the advertisement or who view a different advertisement.

The content publisher may generate an impression block on a zero knowledge blockchain recording the transfer of the exposed and control impression token values to the users (step 605). The various transfers may be recorded in the same block, or each transfer may be recorded in its own block. The content publisher adds the impression block to the blockchain. The content publisher generates a zero knowledge proof of validity using a proving key, and publishes the new block to the blockchain.

A subset of the users receiving exposed impression token values and a subset of the users receiving control impression token values may transmit a request for content to the merchant (step 606). For example, a user may open a mobile application, select a link, or type in a URL on the client device. The user may perform an action, such as purchasing a good or service from the merchant, viewing a video provided by the merchant, or creating an account with the merchant. In response to the purchase or other action, the merchant may transfer a conversion token value to the user (step 607). The merchant adds a conversion block to the blockchain. The merchant may generate a zero knowledge proof of validity using the merchant's proving key, and the merchant may publish the new conversion block to the blockchain. The merchant may instruct the user to transfer impression and conversion token values to a measurement company. In one embodiment, the merchant may offer the user a discount on the purchase if the user agrees to transmit the impression and conversion token values to the measurement company. In one embodiment, the merchant may instruct the user that, as a condition of the purchase, the user agrees to transmit the impression and token values to the measurement company. The merchant may transmit a wallet address of the measurement company to the client device to assist the user in transmitting the impression and conversion token values to the measurement company.

The client device may transmit the impression token value and the conversion token value to the measurement company (step 608). The client device may generate a measurement block on the zero knowledge blockchain recording the transfer of the impression token value and the conversion token value to the measurement company. The client device adds the measurement block to the blockchain. The client device generates a zero knowledge proof of validity using a proving key, and publishes the new block to the blockchain. The zero knowledge proof may expose relative timing information to the measurement company. For example, the zero knowledge proof may provide the specific time at which any impression token values were received by the user, as well as the specific time at which any conversion token values were received by the user. The user may have received impression tokens from multiple different content publishers, and the impression tokens may have been generated by, and traceable back to the respective content publishers.

The measurement company may evaluate the impression token values and the conversion token values and calculate a lift result (step 609). For example, the measurement company may determine that users that viewed the advertisement for the merchant were 10% more likely to make a purchase from the merchant than users who had not viewed the advertisement. Those skilled in the art will recognize that many complex lift algorithms are known in the art, and the measurement company may use any suitable known lift schemes in order to calculate the attribution result.

The measurement company may transmit the lift results to the content publisher or the merchant. In embodiments where the measurement company is a subsystem of the merchant or the content publisher, the merchant or the content publisher may receive the impression tokens and the conversion tokens directly from the user, and the merchant or the content publisher may calculate the attribution and lift results. The content publisher and the merchant may utilize the attribution and lift results to better inform future advertisement campaigns, or to calculate compensation owed by the merchant to the content publisher in exchange for the content publisher transmitting the advertisement to the client device.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A computer-implemented method comprising:
   transmitting, by a content publisher, an advertisement of a merchant to a client device;
   transferring, by the content publisher, an impression token value of impression tokens to the client device based on the transmitting of the advertisement, wherein the impression tokens are generated by the content publisher, wherein the impression token value is trans- ferred in response to the content publisher providing the advertisement of the merchant for display on the client device;

publishing, by the content publisher, an impression block to a zero knowledge blockchain, wherein the impression block records the transferring of the impression token value;

receiving, by the content publisher, a conversion block published to the zero knowledge blockchain by the merchant in response to a purchase from the merchant by the client device, wherein the conversion block records a transfer of a conversion token value of conversion tokens from the merchant to the client device in response to the purchase from the merchant by the client device, wherein the conversion tokens are generated by the merchant;

receiving, by a measurement company, the impression token value and the conversion token value from the client device and relative timing information from the client device, wherein the client device publishes a measurement block to the zero knowledge blockchain recording the transfer of the impression token value and the conversion token value from the client device to the measurement company, wherein the relative timing information is exposed to the measurement company through a proof generated by the client device, the relative timing information indicating a first time the impression token value was received by the client device and a second time the conversion token value was received by the client device; and attributing, by the measurement company, the purchase to the content publisher based on the first time and the second time indicated in the relative timing information and the transfer of the impression token value and the conversion token value recorded in the measurement block.

2. The computer-implemented method of claim 1, further comprising, generating, by the content publisher, the plurality of impression tokens.

3. The computer-implemented method of claim 1, further comprising storing, by the content publisher, a copy of the zero knowledge blockchain.

4. The computer-implemented method of claim 3, wherein the copy of the zero knowledge blockchain comprises the impression block, the conversion block, and the measurement block.

5. The computer-implemented method of claim 4, further comprising calculating, by the content publisher, a lift calculation indicating an increase in likelihood a user will convert on the advertisement in response to viewing the advertisement based on, at least in part, the relative timing information for the client device.

6. The computer-implemented method of claim 1, further comprising generating, by the content publisher, a zero knowledge proof verifying the transferring of the impression token value.

7. A non-transitory computer-readable storage medium comprising instructions executable by a processor, the instructions when executed causing the processor to perform actions comprising:

transmitting, by the processor, an advertisement of a merchant to a client device;

transferring, by the processor, an impression token value of impression tokens to the client device based on the transmitting of the advertisement, wherein the impression tokens are generated by the processor, wherein the impression token value is transferred in response to the content publisher providing the advertisement of the merchant for display on the client device;

publishing, by the processor, an impression block to a zero knowledge blockchain, wherein the impression block records the transferring of the impression token value;

receiving, by the processor, a conversion block published to the zero knowledge blockchain by the merchant in response to a purchase from the merchant by the client device, wherein the conversion block records a transfer of a conversion token value of conversion tokens from the merchant to the client device in response to the purchase from the merchant by the client device, wherein the conversion tokens are generated by the merchant;

receiving, by a measurement company, the impression token value and the conversion token value from the client device and relative timing information from the client device, wherein the client device publishes a measurement block to the zero knowledge blockchain recording the transfer of the impression token value and the conversion token value from the client device to the measurement company, wherein the relative timing information is exposed to the measurement company through a proof generated by the client device, the relative timing information indicating a first time the impression token value was received by the client device and a second time the conversion token value was received by the client device; and attributing, by the measurement company, the purchase to a content publisher based on the first time and the second time indicated in the relative timing information and the transfer of the impression token value and the conversion token value recorded in the measurement block.

8. The non-transitory computer-readable storage medium of claim 7, the actions further comprising, generating, by the processor, the plurality of impression tokens.

9. The non-transitory computer-readable storage medium of claim 7, the actions further comprising storing, by the processor, a copy of the zero knowledge blockchain.

10. The non-transitory computer-readable storage medium of claim 9, wherein the copy of the zero knowledge blockchain comprises the impression block, the conversion block, and the measurement block.

11. The non-transitory computer-readable storage medium of claim 10, the actions further comprising calculating, by the content publisher, a lift calculation indicating an increase in likelihood a user will convert on the advertisement in response to viewing the advertisement based on, at least in part, the relative timing information for the client device.

12. The non-transitory computer-readable storage medium of claim 7, the actions further comprising generating, by the processor, a zero knowledge proof verifying the transferring of the impression token value.

13. A computer system comprising:
a computer processor; and
a non-transitory computer-readable storage medium comprising instructions that when executed by the computer processor cause the computer system to perform actions comprising:

transmitting, by the computer system, an advertisement of a merchant to a client device;

transferring, by the computer system, an impression token value of impression tokens to the client device based on the transmitting of the advertisement, wherein the impression tokens are generated by the computer system, wherein the impression token value is transferred in response to the content publisher providing the advertisement of the merchant for display on the client device; and publishing, by the computer system, an impression block to a zero knowledge blockchain, wherein the impression block records the transferring of the impression token value;

receiving, by the computer system, a conversion block published to the zero knowledge blockchain by the merchant in response to a purchase from the merchant by the client device, wherein the conversion block records a transfer of a conversion token value of conversion tokens from the merchant to the client device in response to the purchase from the merchant by the client device, wherein the conversion tokens are generated by the merchant;

receiving, by a measurement company, the impression token value and the conversion token value from the client device and relative timing information from the client device, wherein the client device publishes a measurement block to the zero knowledge blockchain recording the transfer of the impression token value and the conversion token value from the client device to the measurement company, wherein the relative timing information is exposed to the measurement company through a proof generated by the client device, the relative timing information indicating a first time the impression token value was received by the client device and a second time the conversion token value was received by the client device; and attributing, by the measurement company, the purchase to a content publisher based on the first time and the second time indicated in the relative timing information and the transfer of the impression token value and the conversion token value recorded in the measurement block.

14. The computer system of claim 13, the actions further comprising, generating, by the processor, the plurality of impression tokens.

15. The computer system of claim 13, the actions further comprising storing, by the computer system, a copy of the zero knowledge blockchain.

16. The computer system of claim 15, wherein the copy of the zero knowledge blockchain comprises the impression block, the conversion block, and the measurement block.

17. The computer system of claim 16, the actions further comprising calculating, by the content publisher, a lift calculation indicating an increase in likelihood a user will convert on the advertisement in response to viewing the advertisement based on, at least in part, the relative timing information for the client device.

* * * * *